US011739810B2

(12) United States Patent
Liu et al.

(10) Patent No.: US 11,739,810 B2
(45) Date of Patent: Aug. 29, 2023

(54) BIDIRECTIONAL COLLAPSE-PROOF DAMPER WITH MACROSCOPIC NPR STRUCTURE AND BRIDGE STRUCTURE HAVING SAME

(71) Applicants: Institute of Urban Safety and Environmental Science, Beijing Academy of Science and Technology, Beijing (CN); Wenzhou University, Wenzhou (CN)

(72) Inventors: Bideng Liu, Beijing (CN); Yongli Yang, Beijing (CN); Yubin Wu, Beijing (CN); Ruixiang Song, Beijing (CN); Qiong Wu, Beijing (CN)

(73) Assignees: Institute of Urban Safety and Environmental Science, Beijing Academy of Science and Technology, Beijing (CN); Wenzhou University, Wenzhou (CN)

( * ) Notice: Subject to any disclaimer, the term of this patent is extended or adjusted under 35 U.S.C. 154(b) by 0 days.

(21) Appl. No.: 17/973,572

(22) Filed: Oct. 26, 2022

(65) Prior Publication Data

US 2023/0043495 A1 Feb. 9, 2023

(30) Foreign Application Priority Data

May 19, 2022 (CN) ........................ 202210541220.X

(51) Int. Cl.
*F16F 7/00* (2006.01)
*F16F 15/04* (2006.01)
*E01D 19/00* (2006.01)

(52) U.S. Cl.
CPC .............. *F16F 15/04* (2013.01); *E01D 19/00* (2013.01); *F16F 7/00* (2013.01); *F16F 2228/063* (2013.01)

(58) Field of Classification Search
CPC . F16F 15/04; E04H 9/02; E04H 9/021; E04H 9/0215; E04H 9/0237; E04B 1/98
See application file for complete search history.

(56) References Cited

FOREIGN PATENT DOCUMENTS

| | | | | |
|---|---|---|---|---|
| CN | 105604203 A | | 5/2016 | |
| CN | 111322349 A | * | 6/2020 | |
| CN | 111764526 A | | 10/2020 | |
| CN | 113294471 A | * | 8/2021 | ................ F16F 7/00 |

* cited by examiner

*Primary Examiner* — Babajide A Demuren
(74) *Attorney, Agent, or Firm* — Zhigang Ma

(57) ABSTRACT

The present invention discloses a bidirectional collapse-proof damper with a macroscopic NPR structure and a bridge structure having the same, comprising a sleeve and a sliding rod; by adding a structure of a reducing part and a limiting body, a sliding gap exists between both ends of the limiting body and both inner ends of the reducing part; the rod body is connected with the inner side wall of the sleeve through an elastic element; the limiting body and the rod body can realize bidirectional slip in the sleeve, which have multi-level seismic performance.

12 Claims, 6 Drawing Sheets

BIDIRECTIONAL COLLAPSE-PROOF DAMPER WITH MACROSCOPIC NPR STRUCTURE AND BRIDGE STRUCTURE HAVING SAME

TECHNICAL FIELD

The present invention relates to the technical field of civil engineering, and in particular to a bidirectional collapse-proof damper with a macroscopic NPR structure and a bridge structure having the same.

BACKGROUND

Under the action of strong earthquakes, the bridge superstructure (girders) located on the bridge bearing is prone to large longitudinal and transverse displacement due to the action of earthquake inertia force, which may cause damage to girders due to collision between the girders, or even collapse of girders to interrupt traffic in serious cases. The reason is too few connections between the girders, resulting in insufficient constraints, and insufficient energy consumption during the movement of the girders.

The existing collapse-proof device adopts anti-collision blocks or shear hinges or shear walls to reduce energy through the plastic damage of the blocks or shear walls, which will cause damage to the girders or the parts connected with the girders, and the cost of post-earthquake repair is high. Alternatively, steel damper pull rods, oil damper pull rods or shape memory alloy pull rods can be arranged to consume seismic energy, so as to effectively avoid damage to concrete girders and reduce the repair difficulty. However, steel pull rods are easy to break, oil dampers are easy to leak oil, and shape memory alloy is expensive. Moreover, the dampers are too restrictive to building structures or bridges under aeolian vibration, environmental vibration, train vibration and temperature deformation, which is not conducive to the freedom of deformation.

Therefore, the problem to be solved by those skilled in the art is how to provide a collapse-proof damper with simple structure, which can realize bidirectional displacement and timely resetting, effectively control deformation locking, apply to multi-level vibration, prevent collapse of the bridge, increase the stability of the bridge structure, reduce damage to the parent structure after earthquakes, reduce the repair difficulty and save the cost.

SUMMARY

In view of this, the present invention provides a bidirectional collapse-proof damper with a macroscopic NPR structure and a bridge structure having the same, aiming to solve the above technical problem.

To achieve the above purpose, the present invention adopts the following technical solution:

A bidirectional collapse-proof damper with a macroscopic NPR structure, comprising:

A sleeve; the sleeve has a hollow structure, and one end of the sleeve is fixedly connected to a bridge component I; and the middle part of the sleeve has a reducing part with an increasing radial dimension;

A sliding rod; the sliding rod is sleeved in the sleeve, the middle part of the sliding rod is provided with a limiting body slidably connected with the reducing part, and a sliding gap exists between both ends of the limiting body and both inner ends of the reducing part; the rod body of the sliding rod located at both sides of the limiting body is connected with the inner side wall of the sleeve through an elastic element so that the limiting body and the rod body can realize bidirectional sliding displacement in the sleeve; and one end of the sliding rod away from the bridge component I extends to the outer side of the sleeve and is fixedly connected to a bridge component II.

With the above technical solution, in the bidirectional collapse-proof damper with a macroscopic NPR structure provided by the present invention, the middle part of the sleeve has a reducing part with an increasing radial dimension, and the sliding rod has a limiting body structure slidably connected with the reducing part; a sliding gap exists between both ends of the limiting body and both inner ends of the reducing part; the rod body of the sliding rod located at both sides of the limiting body is connected with the inner side wall of the sleeve through an elastic element so that the limiting body and the rod body can realize bidirectional sliding displacement in the sleeve; the structure arrangement has multi-level seismic performance; in the event of small shock caused by wind, train motion and microearthquakes as well as small deformation caused by temperature stress, the rod body can slide freely, and the external force is balanced with the elastic force provided by the elastic element and the sliding friction; in the event of large deformation and vibration caused by small and moderate earthquakes, the motion of the limiting body expands the reducing part of the sleeve to provide main resistance, which consumes vibrational energy under the combined action of the elastic force provided by the elastic element; and in the event of super deformation and vibration, the limiting body and the rod body move, and are locked when the displacement reaches the elastic limit of the elastic element and exceeds the gap between the limiting body and the reducing part to prevent collapse of girders of a superstructure, and resetting can be realized under the action of the elastic element. The present invention has simple structure, safety and reliability, greatly enhances the collapse-proof protection effect on the bridge structure, minimizes damage of vibration to the parent structure, and saves the repair cost.

Preferably, in the above bidirectional collapse-proof damper with a macroscopic NPR structure, the reducing part has a bidirectional conical olive shape; and the reducing part has a horizontal segment I with a uniform cross section in the position with the maximum cross section in the middle part, which can ensure the displacement of the limiting body in the reducing part and no deformation during slip.

Preferably, in the above bidirectional collapse-proof damper with a macroscopic NPR structure, the limiting body has the same structure as the reducing part, and the limiting body has a horizontal segment II with a uniform cross section in the position with the maximum cross section in the middle part; and the length of the horizontal segment II is less than that of the horizontal segment I, and the horizontal segment II is fitted to the horizontal segment 1. The reducing part and the limiting body both have an olive shape, and the limiting body can realize bidirectional sliding displacement in the reducing part and have high rigidity and strength, which can ensure no deformation during slip.

Preferably, in the above bidirectional collapse-proof damper with a macroscopic NPR structure, stoppers I are fixed on the inner side walls of both ends of the sleeve; stoppers II, are fixed on the rod body; and the rod body is sleeved with a spring, and both ends of the spring are respectively fixed on the stoppers I and the stoppers II. The structure is simple and stable; the stoppers I and the stoppers II are arranged as locking members, which can play a role of restraining the spring; in the event of super deformation and vibration, the limiting body and rod body push the spring, the stoppers I and the stoppers II during displacement, which can provide a locking effect and prevent collapse of the bridge; the spring is a tension and compression steel spring which has a high elastic limit, plays a role of alleviating vibration and shock by using the energy stored during elastic deformation, and ensures that the maximum elongation of the spring being compressed to a minimum shall not exceed the elastic limit, so as to ensure that the spring can be restored to provide reliable restoring force; and the elastic limit on the rod body is greater than the threshold friction of the limiting body sliding in the reducing part, which can realize the sliding displacement of the rod body in the sleeve and is suitable for different degrees of deformation and vibration.

Preferably, in the above bidirectional collapse-proof damper with a macroscopic NPR structure, one end of the sleeve is fixedly connected with a fixing element, and the fixing element is fixedly connected to the bridge component I. The structure is stable, and the bridge component I can be a girder or a pier stud.

Preferably, in the bidirectional collapse-proof damper with a macroscopic NPR structure, one end of the sliding rod away from the bridge component I is fixedly connected with an end plate, and the end plate is fixedly connected to the bridge component II. The structure is stable, the bridge component II can be a girder or a pier stud, and the end plate and the fixing element can be connected to the girder or the pier stud as required.

Preferably, in the bidirectional collapse-proof damper with a macroscopic NPR structure, wherein the sleeve has a circular section and is made of low carbon steel. The use of low carbon steel makes the sleeve have a certain thickness and structural strength. Even after the cone of the limiting body slips and is pushed out, the sleeve still has a high structural strength, making the overall structure more stable.

Preferably, in the above bidirectional collapse-proof damper with a macroscopic NPR structure, the inner side wall of the sleeve is coated with a lubricant coating and a corrosion resistant coating, which can be a Teflon coating with lubrication effect or other coatings instead to enhance the corrosion resistance and the lubrication and friction reduction effect of the sleeve.

Preferably, in the above bidirectional collapse-proof damper with a macroscopic NPR structure, the number of bidirectional collapse-proof dampers with a macroscopic NPR structure is one or a plurality of groups. One or a plurality of groups of bidirectional collapse-proof dampers with a macroscopic NPR structure can be installed according to the structure, performance and requirements of the bridge to enhance the collapse-proof protection effect.

The present invention also provides a bridge structure, comprising the above bidirectional collapse-proof damper with a macroscopic NPR structure.

It can be known from the above technical solution that compared with the prior art, the present invention provides a bidirectional collapse-proof damper with a macroscopic NPR structure and a bridge structure having the same, having the following technical effects:

1. The structure is simple, stable, safe and reliable.

2. The present invention can provide stable collapse-proof protection structure and protection effect for the bridge structure.

3. The present invention can apply to different degrees of deformation and vibration and have the characteristic of bidirectional displacement. In the event of small shock caused by wind, train motion and microearthquakes as well as small deformation caused by temperature stress, the rod body can slide freely under the action of the elastic element, and the external force is balanced with the elastic force and the sliding friction; in the event of large deformation and vibration caused by small and moderate earthquakes, the motion of the limiting body expands the reducing part of the sleeve to provide main resistance, which consumes vibrational energy under the combined action of the elastic force provided by the elastic element; and in the event of super deformation and vibration, the limiting body and the rod body push the spring, the stoppers I and the stoppers II for displacement, and are locked when the displacement reaches the elastic limit of the spring and exceeds the gap between the limiting body and the reducing part to prevent collapse of the bridge, and resetting can be realized under the action of the spring.

4. The damage of vibration to the parent structure can be minimized, and the repair cost can be reduced.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

In the figures.

Figure 1:
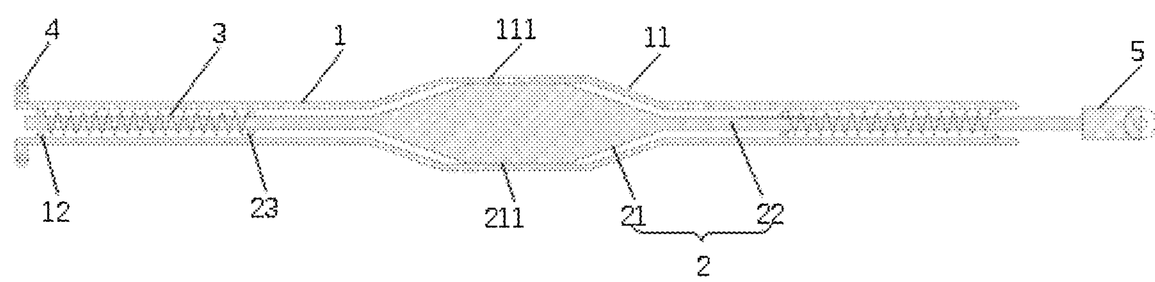
FIG. 1 is a structural schematic diagram of a bidirectional collapse-proof damper with a macroscopic NPR structure provided by the present invention.
Figure 2:
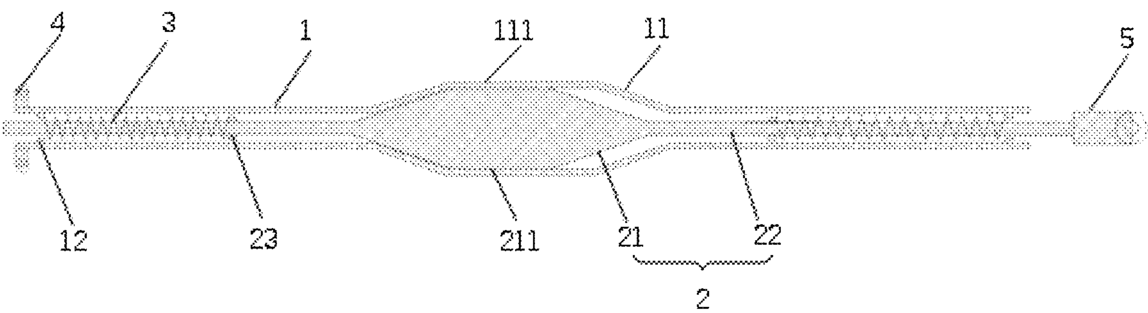
FIG. 2 is a structural schematic diagram showing displacement of a sliding rod provided by the present invention.
Figure 3:
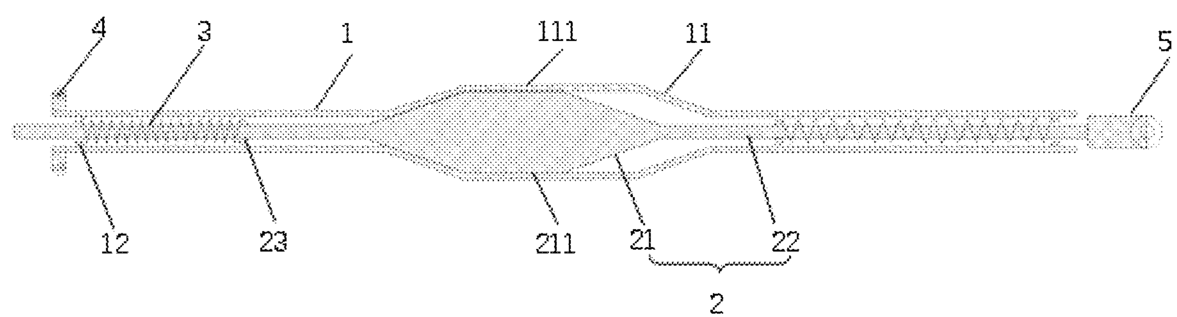
FIG. 3 is another structural schematic diagram showing displacement of a sliding rod provided by the present invention.
Figure 4:
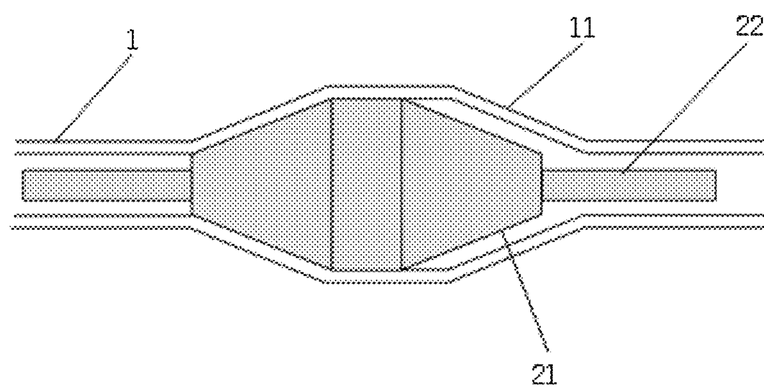
FIG. 4 is a structural schematic diagram showing left displacement of a sliding rod provided by the present invention.
Figure 5:
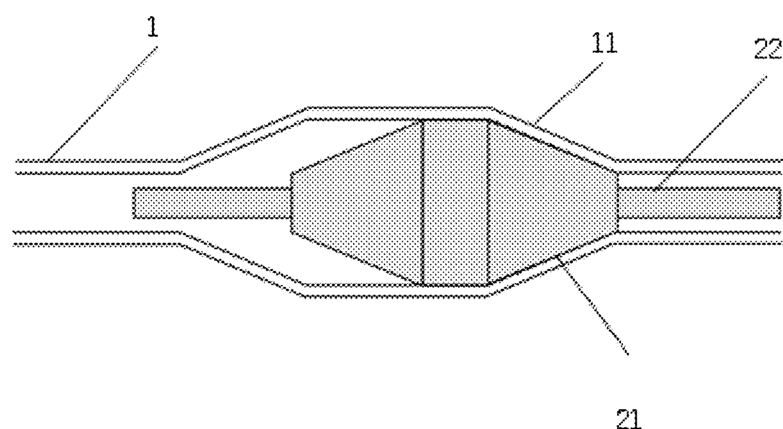
FIG. 5 is a structural schematic diagram showing right displacement of a sliding rod provided by the present invention.

1—sleeve;

11—reducing part; 111—horizontal segment I; 12—stopper I;

2—sliding rod;

1—limiting body; 211—horizontal segment II; 22—rod body; 23—stopper II;

3—spring;

4—fixing element;

5—end plate.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiment 1

Referring to FIG. 1 to FIG. 5, embodiments of the present invention disclose a bidirectional collapse-proof damper with a macroscopic NPR structure, comprising:

A sleeve 1; the sleeve 1 has a hollow structure, and one end of the sleeve 1 is fixedly connected to a bridge component I; and the middle part of the sleeve 1 has a reducing part 11 with an increasing radial dimension;

A sliding rod 2; the sliding rod 2 is sleeved in the sleeve 1, the middle part of the sliding rod 2 is provided with a limiting body 21 slidably connected with the reducing part 11, and a sliding gap exists between both ends of the limiting body 21 and both inner ends of the reducing part 11; the rod body 22 of the sliding rod 2 located at both sides of the limiting body 21 is connected with the inner side wall of the sleeve 1 through an elastic element so that the limiting body 21 and the rod body 22 can realize bidirectional sliding displacement in the sleeve 1; and one end of the sliding rod 2 away from the bridge component I extends to the outer side of the sleeve 1 and is fixedly connected to a bridge component II.

To further optimize the above technical solution, the reducing part 11 has a bidirectional conical olive shape; and the reducing part 11 has a horizontal segment I 111 with a uniform cross section in the position with the maximum cross section in the middle part.

To further optimize the above technical solution, the limiting body 21 has the same structure as the reducing part 11, and the limiting body 21 has a horizontal segment II 211 with a uniform cross section in the position with the maximum cross section in the middle part; and the length of the horizontal segment II 211 is less than that of the horizontal segment I 111, and the horizontal segment II 211 is fitted to the horizontal segment 1 111.

To further optimize the above technical solution, stoppers I 12 are fixed on the inner side walls of both ends of the sleeve; stoppers II 23 are fixed on the rod body 22; and the rod body 22 is sleeved with a spring 3, and both ends of the spring 3 are respectively fixed on the stoppers I 12 and the stoppers II 23.

To further optimize the above technical solution, one end of the sleeve 1 is fixedly connected with a fixing element 4, and the fixing element 4 is fixedly connected to the bridge component I.

To further optimize the above technical solution, one end of the sliding rod 2 away from the bridge component I is fixedly connected with an end plate 5, and the end plate 5 is fixedly connected to the bridge component II.

To further optimize the above technical solution, the sleeve 1 has a circular section and is made of low carbon steel.

To further optimize the above technical solution, the inner side wall of the sleeve 1 is coated with a lubricant coating and a corrosion resistant coating.

To further optimize the above technical solution, the number of bidirectional collapse-proof dampers with a macroscopic NPR structure is one or a plurality of groups.

Embodiment 2

Figure 6:
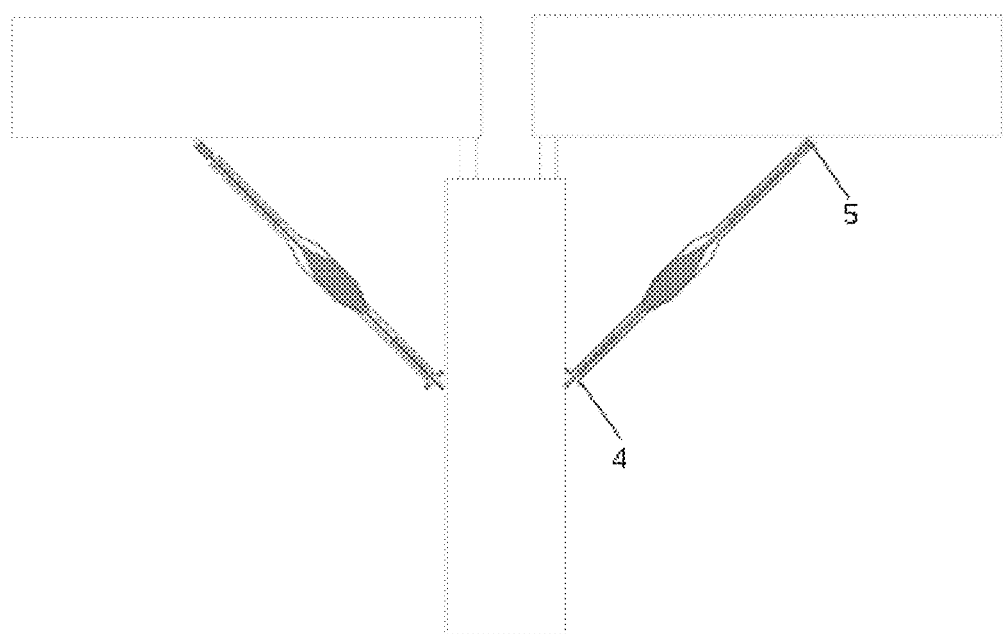
FIG. 6 is a structural schematic diagram showing displacement of a bidirectional collapse-proof damper with a macroscopic NPR structure provided by the present invention, which is installed on a bridge structure.

Referring to FIG. 6, embodiments of the present invention disclose a bridge structure, comprising a bidirectional collapse-proof damper with a macroscopic NPR structure provided in embodiment 1. The implementation mode of the embodiment is the same as that of embodiment 1 and will not be repeated here.

The implementation mode of the present invention is as follows:

In use, one end of the sleeve 1 with the fixing element 1 is fixedly connected to the bridge component I, and one end of the sliding rod 2 with the end plate 5 is fixedly connected to the bridge component II; and installation can be carried out horizontally or longitudinally, and a plurality of groups of bidirectional collapse-proof dampers with a macroscopic NPR structure can be installed as required to enhance the collapse-proof protection effect on the bridge structure.

The present invention not only can be applied to a bridge structure, but also can be applied to other building structures, so as to enhance the collapse-proof protection effect on the building structures.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A bidirectional collapse-proof damper with a macroscopic NPR structure, comprising:

a sleeve (1); the sleeve (1) has a hollow structure, and one end of the sleeve (1) is fixedly connected to a building component I; and the middle part of the sleeve (1) has a reducing part (11) with an increasing radial dimension;

a sliding rod (2), the sliding rod (2) is sleeved in the sleeve (1), the middle part of the sliding rod (2) is provided with a limiting body (21) slidably connected with the reducing part (11), and a sliding gap exists between both ends of the limiting body (21) and both inner ends of the reducing part (11); the rod body (22) of the sliding rod (2) located at both sides of the limiting body (21) is connected with the inner side wall of the sleeve (1) through an elastic element so that the limiting body (21) and the rod body (22) can realize bidirectional sliding displacement in the sleeve (1); and one end of the sliding rod (2) away from the building component I extends to the outer side of the sleeve (1) and is fixedly connected to a building component II;

the reducing part (11) has a bidirectional conical olive shape; and the reducing part (11) has a horizontal segment I (111) with a uniform cross section in the position with the maximum cross section in the middle part;

the limiting body (21) has the same structure as the reducing part (11), and the limiting body (21) has a horizontal segment II (211) with a uniform cross section in the position with the maximum cross section in the middle part; and the length of the horizontal segment II (211) is less than that of the horizontal segment I (111), and the horizontal segment II (211) is fitted to the horizontal segment 1 (111);

stoppers I (12) are fixed on the inner side walls of both ends of the sleeve (1); stoppers II (23) are fixed on the rod body (22); and the rod body (22) is sleeved with a spring (3), and both ends of the spring (3) are respectively fixed on the stoppers I (12) and the stoppers II (23);

the sleeve (1) is made of low carbon steel.

2. The bidirectional collapse-proof damper with a macroscopic NPR structure according to claim 1, wherein one end of the sleeve (1) is fixedly connected with a fixing element (4), and the fixing element (4) is fixedly connected to the building component I.

3. The bidirectional collapse-proof damper with a macroscopic NPR structure according to claim 1, wherein one end of the sliding rod (2) away from the building component I is fixedly connected with an end plate (5), and the end plate (5) is fixedly connected to the building component II.

4. The bidirectional collapse-proof damper with a macroscopic NPR structure according to claim 1, wherein the sleeve (1) has a circular section.

5. The bidirectional collapse-proof damper with a macroscopic NPR structure according to claim 4, wherein the inner side wall of the sleeve (1) is coated with a lubricant coating and a corrosion resistant coating.

6. The bidirectional collapse-proof damper with a macroscopic NPR structure according to claim 1, wherein the number of bidirectional collapse-proof dampers with a macroscopic NPR structure is one or a plurality of groups.

7. A building structure, comprising the bidirectional collapse-proof damper with a macroscopic NPR structure of claim 1.

8. A building structure, comprising the bidirectional collapse-proof damper with a macroscopic NPR structure of claim 2.

9. A building structure, comprising the bidirectional collapse-proof damper with a macroscopic NPR structure of claim 3.

10. A building structure, comprising the bidirectional collapse-proof damper with a macroscopic NPR structure of claim 4.

11. A building structure, comprising the bidirectional collapse-proof damper with a macroscopic NPR structure of claim 5.

12. A building structure, comprising the bidirectional collapse-proof damper with a macroscopic NPR structure of claim 6.

* * * * *